(12) United States Patent
Martin, III

(10) Patent No.: US 6,991,574 B2
(45) Date of Patent: Jan. 31, 2006

(54) DUAL LEVEL OIL IMPELLER FOR DRIVE AXLE ASSEMBLY

(75) Inventor: Robert James Martin, III, Newark, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 93 days.

(21) Appl. No.: 10/754,033

(22) Filed: Jan. 8, 2004

(65) Prior Publication Data

US 2005/0150325 A1 Jul. 14, 2005

(51) Int. Cl.
  *F16H 54/04* (2006.01)
  *B60K 17/04* (2006.01)
  *F01M 1/00* (2006.01)

(52) U.S. Cl. .................. 475/159; 74/467; 180/371; 184/6.12; 184/11.2

(58) Field of Classification Search .................. 74/467, 74/607; 475/159–160; 184/6.12, 11.2; 180/371–372
  See application file for complete search history.

(56) References Cited

U.S. PATENT DOCUMENTS

| | | | | |
|---|---|---|---|---|
| 4,352,301 A | * | 10/1982 | Fleury | 74/467 |
| 4,904,840 A | * | 2/1990 | Fidelman | 219/124.34 |
| 5,316,106 A | * | 5/1994 | Baedke et al. | 184/6.12 |
| 6,132,329 A | | 10/2000 | Tison | |
| 6,843,746 B2 | * | 1/2005 | Hayes et al. | 475/160 |
| 2003/0159888 A1 | | 8/2003 | Burkholder | |
| 2005/0005731 A1 | * | 1/2005 | Brill et al. | 74/607 |

FOREIGN PATENT DOCUMENTS

| | | |
|---|---|---|
| DE | 32 38 780 C1 | 1/1984 |
| DE | 101 51 019 A1 | 7/2002 |
| JP | 10304756 A * | 11/1998 |

OTHER PUBLICATIONS

European Search Report, Apr. 6, 2005.

* cited by examiner

*Primary Examiner*—Roger Pang
(74) *Attorney, Agent, or Firm*—Carlson, Gaskey & Olds

(57) ABSTRACT

A drive axle assembly includes an input operably coupled to a power source. The input drives first and second axle shafts, which in turn drive laterally spaced wheel ends. Each wheel end includes a gear set that is driven by one of the axle shafts. The axle shafts are enclosed within a center axle housing and the gear sets are enclosed within gear housings. The drive axle includes a pumping mechanism that maintains predetermined oil levels within the center axle housing and gear housings. The oil level in the center axle housing is lower than the oil level in the gear housing. The pumping mechanism includes an impeller that is mounted for rotation with the axle shaft. The impeller draws oil from the center axle housing into a cavity, which transfers the oil to the gear housing.

20 Claims, 3 Drawing Sheets

DUAL LEVEL OIL IMPELLER FOR DRIVE AXLE ASSEMBLY

BACKGROUND OF THE INVENTION

The subject invention generally relates to a drive axle assembly including a pumping mechanism for maintaining a dual fluid level within the axle assembly. More specifically, the subject invention utilizes the pumping mechanism to maintain a first fluid level within an axle housing and a second, higher, fluid level within a wheel end gear housing.

Many drive axle assemblies utilize gear sets at wheel ends to increase torque output. The gear sets are driven by axle shafts that receive driving input torque from a center differential gear assembly. The axle shafts and center differential gear assembly are enclosed within an axle housing and the wheel end gear sets are enclosed within gear housings mounted to opposing ends of the axle housing.

In order for the center differential gear assembly and the wheel end gear sets to operate smoothly and efficiently, proper lubrication should be maintained. Traditionally, the axle assembly is filled with a lubrication fluid until both the axle housing and gear housing are filled to sufficient lubrication levels. This requires a significant amount of lubricating fluid. Further, the axle housing can be overfilled with fluid in order to achieve the desired fluid levels in the gear housings. This can decrease the overall operating efficiency of the drive axle assembly.

There is a need for a drive axle assembly that can maintain different fluid levels in axle and wheel end gear housings in order to reduce the amount of lubricating fluid needed, in addition to overcoming the other above-mentioned deficiencies in the prior art.

SUMMARY OF THE INVENTION

A drive axle assembly includes a wheel end gear set that is driven by an axle shaft. The axle shaft is substantially enclosed within an axle housing and the wheel end gear set is substantially enclosed within a gear housing. A first fluid level is maintained in the axle housing and a second fluid level, different from the first fluid level, is maintained in the gear housing. A pumping mechanism is driven by the axle shaft to pump fluid from the first fluid level to the second fluid level.

In one disclosed embodiment, the second fluid level is vertically higher than the first fluid level and the pumping mechanism pumps fluid from the lower axle housing level to the higher gear housing level. Preferably, the pumping mechanism is an impeller that is mounted for rotation with the axle shaft. An impeller housing is positioned between the axle housing and gear housing and defines a fluid cavity. The impeller is mounted within the fluid cavity. The impeller moves the fluid from a center portion of the axle housing into the fluid cavity producing a fluid dam. As the impeller continues to move the fluid, the fluid level in the cavity rises. The fluid rises until the fluid reaches a fluid port that fluidly communicates with the gear housing. Preferably, this fluid port is positioned at the second fluid level.

In one disclosed embodiment, the impeller comprises a center tubular portion and a plate portion. The plate portion is an auger shaped member that is welded or similarly attached to the center tubular portion. The tubular portion is preferably press-fit onto the axle shaft. The auger shaped member comprises a disc-shape that includes at least first and second radially extending edges. The first and second edges are laterally spaced apart from each other along an external surface of the tubular member to define a fluid path. As the axle shaft rotates the impeller, fluid is drawn from the center portion of the axle housing, through the fluid path in the impeller, and into the fluid cavity of the impeller housing.

The subject invention provides a simplified method and apparatus for maintaining dual fluid levels in a drive axle assembly, which reduces the amount of fluid needed to maintain adequate lubrication. These and other features of the present invention can be best understood from the following specification and drawings, the following of which is a brief description.

DETAILED DESCRIPTION OF THE PREFERRED EMBODIMENT

Figure 1:
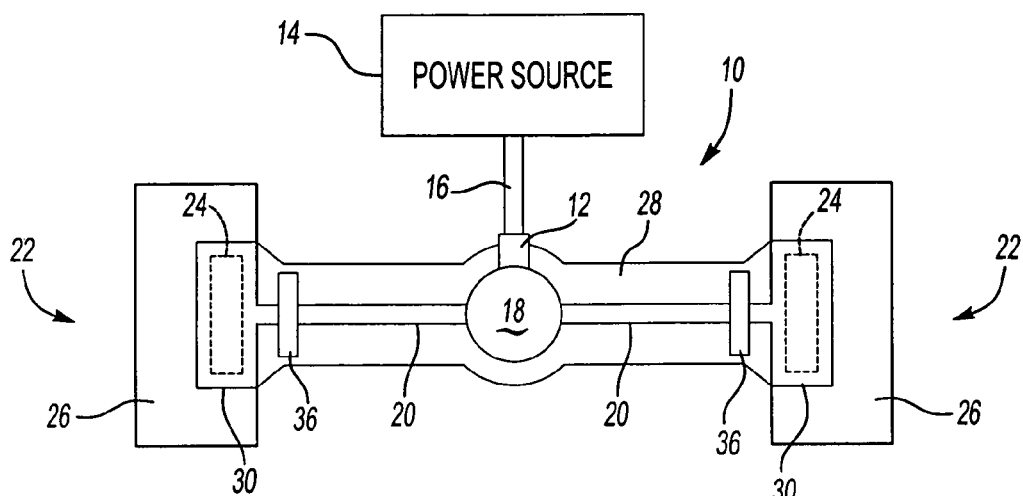
FIG. 1 illustrates a schematic view of a drive axle assembly incorporating the subject invention.

A drive axle assembly incorporating the subject invention is shown generally at 10 in FIG. 1. The drive axle assembly 10 includes an input 12 that is operably coupled to a power source 14 with a driveshaft assembly 16. The power source can be an engine, electric motor, or any other driving power source known in the art. The input 12 drives a differential assembly 18, which in turn drives a pair of axle shafts 20. The axle shafts 20 drive wheel end assemblies shown generally at 22. The differential assembly 18 is a gear set that allows speed differentiation between the axle shafts 20 as the vehicle negotiates through a turn. The operation of the differential assembly 18 is well known and will not be discussed in further detail.

The wheel end assemblies 22 each include a gear set 24 that is driven by one of the axle shafts 20, and which in turn drives a vehicle wheel 26. The gear sets 24 can be planetary, helical, or any other type of wheel end gear set known in the art. The gear sets 24 provide for increased output torque at the vehicle wheels 26 for heavy-duty vehicle applications.

An axle housing 28 substantially surrounds and encloses the axle shafts 20 and the differential assembly 18. The gear sets 24 each include a gear housing 30 that substantially surrounds and encloses the gear sets 24. The gear housings 30 are positioned at opposing ends of the axle housing 28.

The axle 28 and gear 30 housings are partially filled with a lubricating fluid to ensure that the gear sets 24, differential assembly 18, and associated bearings are protected from overheating and wear. The drive axle assembly 10 maintains a dual fluid level within the axle 28 and gear 30 housings, i.e. a first predetermined fluid level 32 is maintained in the axle housing 28 and a second predetermined fluid level 34 is maintained in the gear housings 30. A pumping mechanism 36 is driven by the axle shafts 20 to move the lubricating fluid from a center section of the axle housing 28 to the gear housings 30. The lubricating fluid is preferably an oil-based fluid, however, other lubricating fluids known in the art could also be used.

Figure 2:
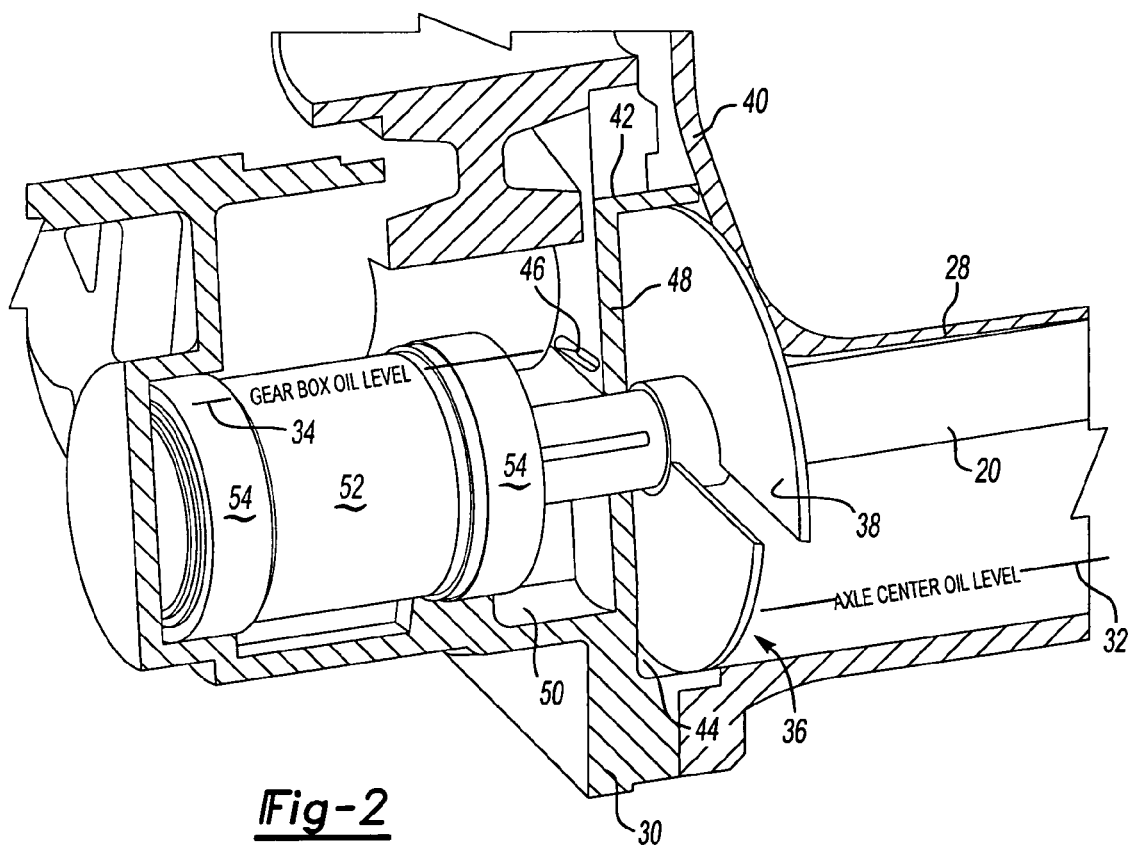
FIG. 2 is a perspective view, partially cut away, of a drive axle and wheel end assembly incorporating the subject invention.
Figure 3:
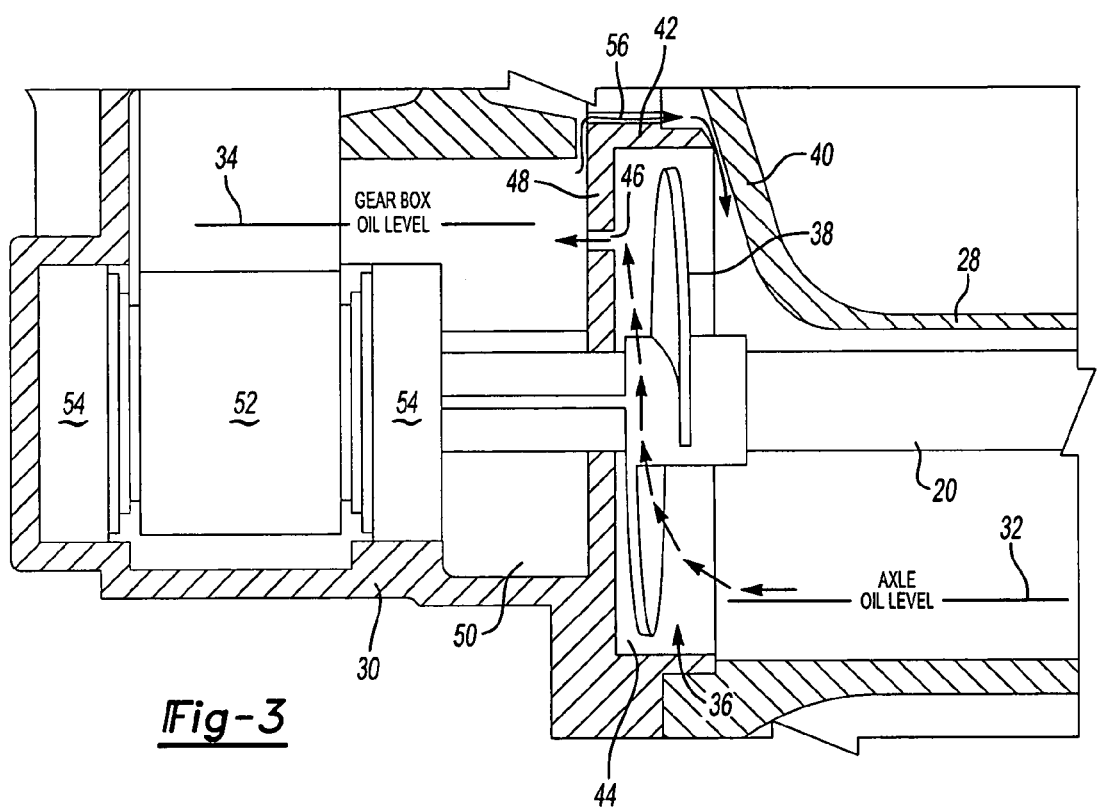
FIG. 3 is a front view of the assembly of FIG. 2.

The pumping mechanism 36 is shown in greater detail in FIGS. 2 and 3. The pumping mechanism 36 preferably comprises an impeller 38 that is mounted for rotation with the respective axle shaft 20. The impeller 38 is positioned near an end 40 of the axle housing 28 and adjacent to the gear housing 30. Preferably, an impeller housing 42 is positioned between the axle housing 28 and the gear housing 30 and defines a fluid cavity 44.

A fluid port 46 is formed within a wall 48 of the impeller housing 42. The wall 48 can be integrally formed within the impeller housing 42 or can be a separate cover plate for the impeller housing 42. The fluid port 46 provides fluid communication from the fluid cavity 44 to a gear cavity 50 defined by the gear housing 30. The wheel end gear set 24 includes a plurality of gears 52 and bearings 54 that are positioned within the gear cavity 50.

The axle shaft 20 drives the impeller 38, which moves the fluid from the center section of the axle housing 28 into the fluid cavity 44, producing a fluid dam. As fluid continues to flow from the lower level center section of the axle housing 28 and into the fluid cavity 44, the fluid level also continues to rise within the fluid cavity 44 until the fluid passes through the fluid port 46. Preferably, the fluid port 46 is positioned at the desired second predetermined fluid level 34 for the gear housing 30. An overflow or return port 56 is also formed in the impeller housing 42 or gear housing 30 at a vertically higher position than the fluid port 46. It the fluid in the gear housing 30 rises above the second predetermined fluid level 34, fluid will flow out of the overflow port 56 and back into the axle housing 28.

The desired flow rate can be tailored by varying the wall clearance between the impeller 38 and the wall 48 of the impeller housing 42. In other words, the flow rate can be varied by adjusting the lateral position of the impeller 38 along the axle shaft 20 relative to the wall 48. The flow rate could also be varied by increasing or decreasing the size of the fluid port 46 and/or the overflow or return port 56 back to the axle housing 28.

Figure 4A:
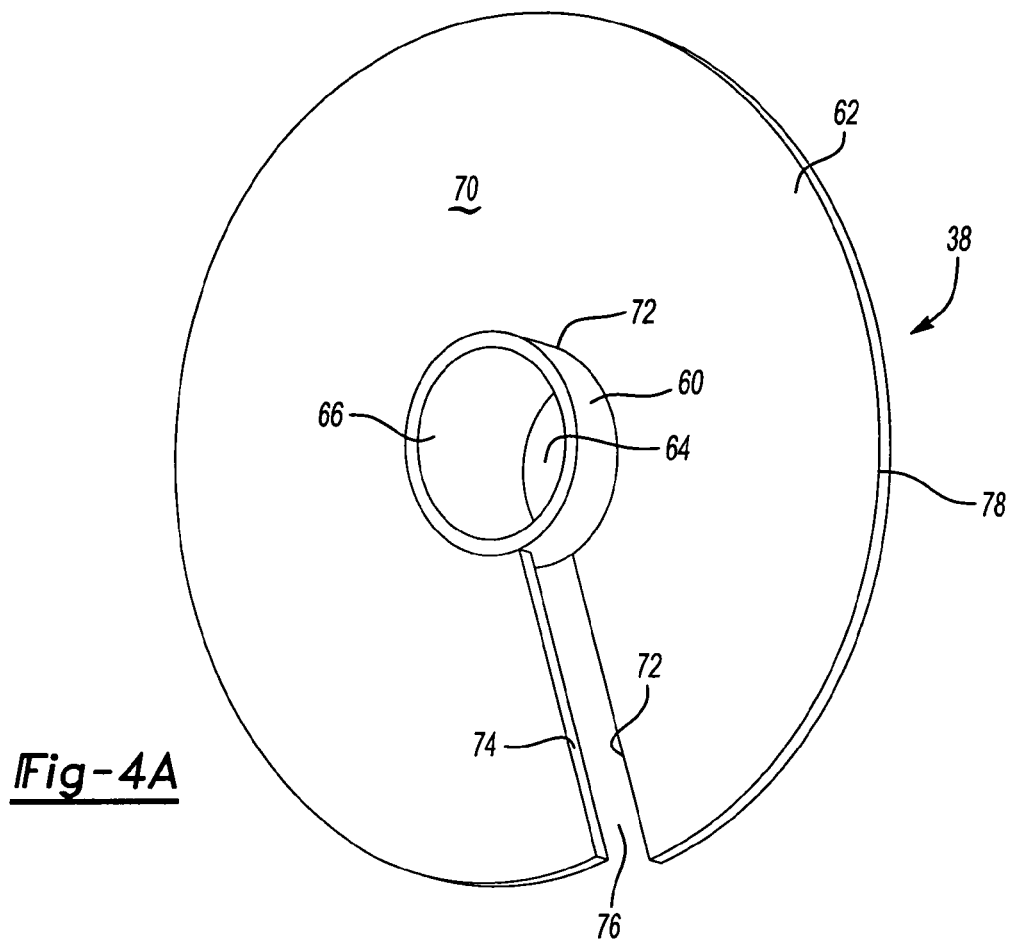
FIG. 4A is a perspective view of a pumping component shown in FIG. 2.
Figure 4B:
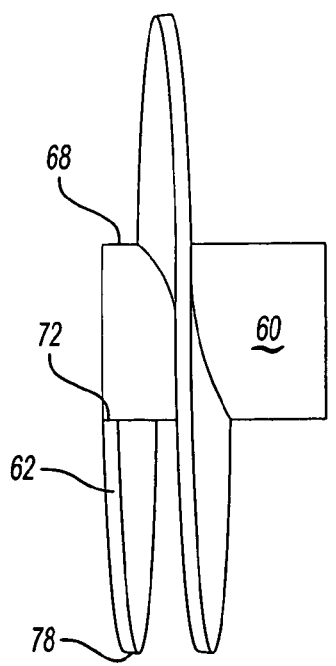
FIG. 4B is a side view of the pumping component shown in FIG. 4A.

The impeller 38 is shown in greater detail in FIGS. 4A and 4B. The impeller 38 preferably includes a center tube portion 60 and a plate portion 62. Preferably, the tube portion 60 is a machined component and the plate portion 62 is a stamped component. The center tube portion 60 includes a center bore 64 defining an internal bore surface 66 and includes an external circumferential surface 68. The axle shaft 20 is received within the center bore 64 such that the axle shaft 20 and tube portion 60 rotate together. The tube portion 60 is preferably press-fit onto the axle shaft 20 such that there is direct engagement between the internal bore surface 66 and the axle shaft 20, however, other attachment methods know in the art could also be used.

The plate portion 62 is preferably an auger shaped member. The auger shaped member comprises a disc 70 having an inner circumference 72 attached to the external circumferential surface 68 of the tube portion 60. Preferably, the disc 70 is welded to the tube portion 60, however, other similar attachment methods could also be used. As discussed above, the disc 70 is preferably made from stamped plate component that is thin in cross-section. Because the cross-section is thin, there are minimal losses due to churning and noise is not generated.

The disc 70 has a first radially extending edge 72 and a second radially extending edge 74. The first and second radially extending edges 72, 74 are laterally spaced apart from each other along the external circumferential surface 68 of the cube portion 60 to define a fluid path or gap 76. This configuration is achieved by providing a radial cut on the disc 70 from the inner circumference 72 to an outer circumference 78. The disc 70 is then stretched in a lateral direction, parallel to the axle shaft 20, such that the first and second radially extending edges 72, 74 are spaced apart from each other. The disc 70 is then welded to the tube portion 60. Fluid flows from the axle housing 28 through the fluid gap 76 and into the fluid cavity 44 of the impeller housing 42.

The subject invention provides a cost effective method and apparatus for maintaining a dual level fluid system within a drive axle assembly 10 that includes wheel end gear sets 24. By utilizing a dual fluid level system, lower quantities of lubricating fluid can be used, which reduces system cost and maintenance cost. Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A drive axle assembly for a vehicle comprising:
an input to be operably coupled to a power source;
at least one axle shaft driven by said input;
an axle housing substantially enclosing said at least one axle shaft;
at least one wheel end including a gear set driven by said at least one axle shaft wherein said gear set is substantially enclosed within a gear housing; and
a pumping mechanism driven by said at least one axle shaft wherein said pumping mechanism includes an impeller shared as an auger and mounted for rotation with said at least one axle shaft wherein said impeller pumps a lubricating fluid from a first predetermined fluid level in said axle housing to a second predetermined fluid level in said gear housing, said second predetermined fluid level being vertically higher than said first predetermined fluid level.

2. The drive axle assembly of claim 1 wherein said impeller includes a tube portion and a plate portion attached to said tube portion.

3. The drive axle assembly of claim 2 wherein said plate portion is shaped as said auger.

4. The drive axle assembly of claim 2 wherein said portion is welded to an outer circumferential surface of said tube portion.

5. The drive axle assembly of claim 2 wherein said tube portion is press-fit onto said at least one axle shaft.

6. The drive axle assembly of claim 2 wherein said plate portion comprises a circular disc with a center opening for receiving said tube portion, said circular disc having a first radially extending edge positioned at a first location on said tube portion arid a second radially extending edge positioned at a second location on said tube portion laterally spaced from said first location to define a fluid flow path.

7. The drive axle assembly of claim 1 including an impeller housing portion laterally positioned between said axle housing and said gear housing, said impeller housing portion defining a cylindrical cavity that receives said impeller.

8. The drive axle assembly of claim 7 including an end plate laterally positioned between said impeller housing portion and said gear housing, said end plate including a fluid port in fluid communication with a gear cavity defined within said gear housing.

9. The drive axle assembly of claim 8 wherein said fluid port is generally positioned at said second predetermined fluid level.

10. The drive axle assembly of claim 8 wherein said impeller pumps said lubricating fluid from said axle housing through a fluid flow path defined by said impeller and into said cylindrical cavity to create a fluid dam.

11. The drive axle assembly of claim 8 wherein said end plate includes an overflow port that is positioned vertically higher on said end plate than said fluid port.

12. The drive axle assembly of claim 1 wherein said at least one axle shaft comprises first and second axle shafts, and said at least one wheel end includes a first wheel end driven by said first axle shaft and a second wheel end driven by said second axle shaft, and wherein said auger comprises a first auger mounted to said first axle shaft to pump lubricating fluid from said axle housing to lubricate said first wheel end and a second auger mounted to said second axle shaft to pump lubricating fluid from said axle housing to lubricate said second wheel end.

13. A method for maintaining a dual fluid level in a drive axle assembly comprising the steps of:
   (a) driving an axle shaft with a power source;
   (b) substantially enclosing the axle shaft within an axle housing;
   (c) driving a wheel end gear set with the axle shaft;
   (d) substantially enclosing the wheel end gear set within a gear housing; and
   (e) mounting an impeller shaped as an auger for rotation with the axle shaft and pumping lubricating fluid with the auger from a first fluid level in the axle housing to a second fluid level in the gear housing where the second fluid level is different than the first fluid level.

14. The method of claim 13 including the steps of positioning an impeller housing laterally between the axle housing and the gear housing and mounting the impeller for rotation within the impeller housing.

15. The method of claim 14 including the step of varying the fluid flow rate from the axle housing to the gear housing by varying a lateral position of the impeller within the impeller housing.

16. The method of claim 14 including the steps of pumping fluid with the auger from the axle housing into the impeller housing, damming fluid within the impeller housing to raise the fluid level up to the second fluid level, and transferring fluid from the impeller housing into the gear housing via a port formed in a wall of the impeller housing when the fluid reaches the second fluid level.

17. The method of claim 13 including the step of positioning the second fluid level vertically higher than the first fluid level.

18. A drive axle assembly for a vehicle comprising:
   first and second axle shafts coupled to a differential assembly;
   an axle housing substantially enclosing said first and second axle shafts;
   a first wheel end including a first gear set driven by said first axle shaft wherein said first gear set is substantially enclosed within a first gear housing;
   a second wheel end including a second gear set driven by said second axle shaft wherein said second gear set is substantially enclosed within a second gear housing; and
   a pumping mechanism including a first impeller driven by said first axle shaft to pump a lubricating fluid from a first predetermined fluid level in said axle housing to a second predetermined fluid level in said first gear housing, and a second impeller driven by said second axle shaft to pump the lubricating fluid from said first predetermined fluid level in said axle housing to a second predetermined fluid level in said second gear housing, said second predetermined fluid level in said first and second gear housings being different than said first predetermined fluid level.

19. The chive axle assembly according to claim 18 wherein said first and said second impellers are shaped as augers.

20. The drive axle assembly according to claim 18 including a first impeller housing positioned between said first gear housing and said axle housing, said first impeller housing defining a first cavity for receiving said first impeller, and including a second impeller housing positioned between said second gear housing and said axle housing, said second impeller housing defining a second cavity for receiving said second impeller.

* * * * *

UNITED STATES PATENT AND TRADEMARK OFFICE
CERTIFICATE OF CORRECTION

PATENT NO. : 6,991,574 B2
APPLICATION NO. : 10/754033
DATED : January 31, 2006
INVENTOR(S) : Martin, III, Robert James It is certified that error appears in the above-identified patent and that said Letters Patent is hereby corrected as shown below:

Column 4:

Line 30: Please delete "shared" and insert --shaped--

Line 42: Please insert --plate-- after "said"

Signed and Sealed this

Fifteenth Day of August, 2006

JON W. DUDAS
*Director of the United States Patent and Trademark Office*